July 24, 1951 G. A. HILEMAN 2,562,035
DEVICE FOR POSITIONING AND HANDLING
CYLINDRICAL ARTICLES
Filed July 14, 1948
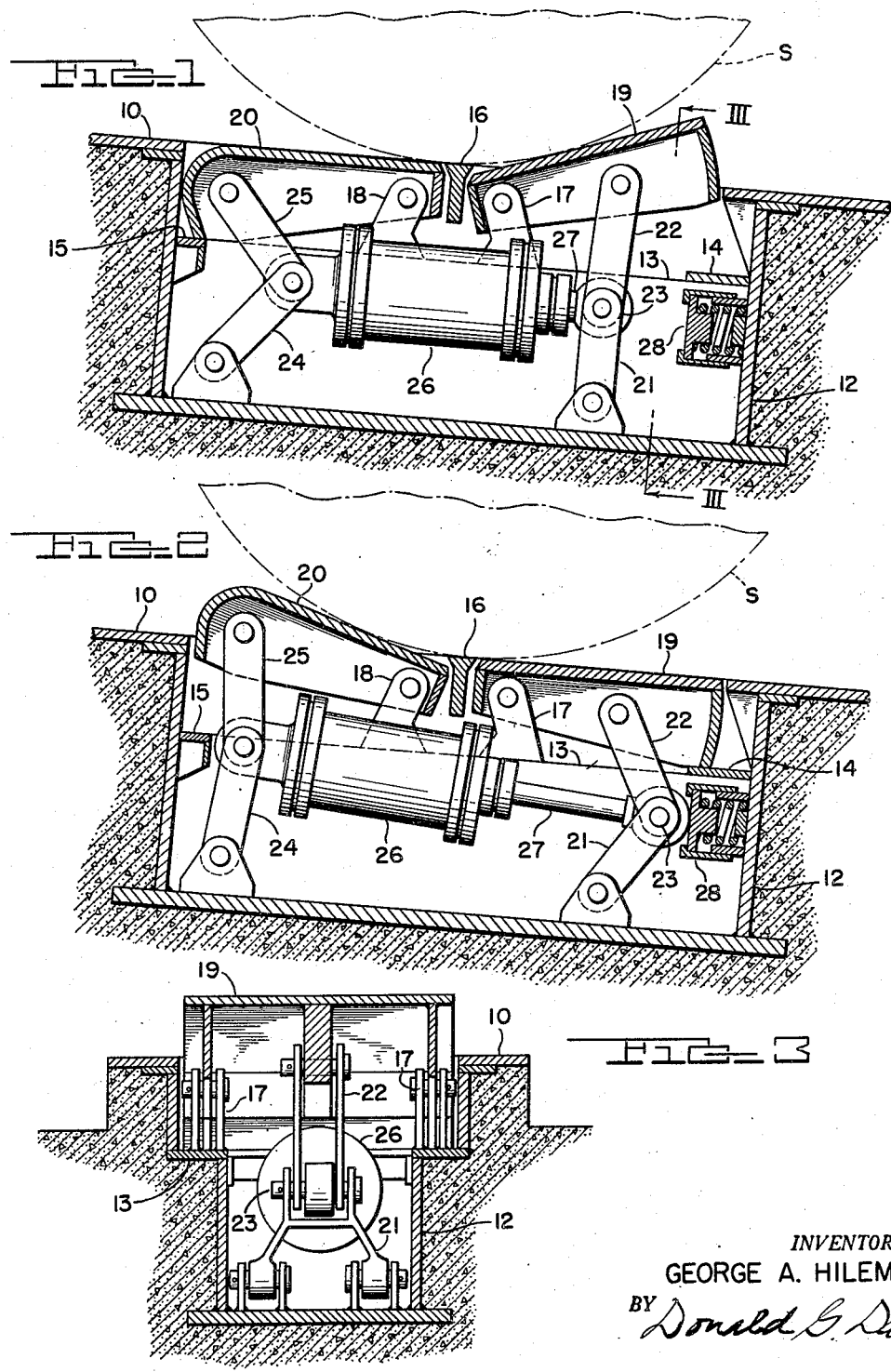
INVENTOR.
GEORGE A. HILEMAN
BY Donald G. Dalton
ATTORNEY Patented July 24, 1951

2,562,035

UNITED STATES PATENT OFFICE 2,562,035

DEVICES FOR POSITIONING AND HANDLING CYLINDRICAL ARTICLES

George A. Hileman, Pittsburgh, Pa., assignor to United States Steel Company, a corporation of New Jersey Application July 14, 1948, Serial No. 38,731

4 Claims. (Cl. 193—32)

This invention relates to devices for positioning and handling cylindrical articles on sloping ramps.

Devices embodying the present invention are particularly suited for handling sheet metal coils preparatory to their entry to processing lines, although obviously the invention is not thus limited. Usual practice in handling these coils includes placing the coils on a sloping ramp and then rolling each coil as it is needed down the ramp for delivery to an uncoiler. Commonly these ramps have several coil positioning stops, which may be retracted to release the coils individually. Previous equipment with which I am familiar has lacked mechanism for starting coils in motion after their release, and in such equipment the stops retract flush with the ramp floor. Therefore, the equipment has disadvantages that manual force often is needed to start the coils, and that coils rolling down a long ramp may gather excess momentum and become difficult to stop at the uncoiler.

An object of the present invention is to provide improved devices for positioning and handling cylindrical articles on sloping ramps, such devices having means for automatically starting the articles in motion after their release.

A further object of the invention is to provide improved stop devices of the foregoing type in which one element always projects above the ramp floor and thereby prevents rolling articles gathering excess momentum.

A further object of the invention is to provide improved devices for positioning and handling cylindrical articles on sloping ramps, such devices including hinged stop and pusher elements and a common operating means which automatically projects one of the elements whenever the other is retracted.

In accomplishing these and other objects of the invention I have provided improved details of structure, a preferred form of which is shown in the accompanying drawings, in which:

Figure 1 is a vertical sectional view of an improved positioning and handling device embodying features of the present invention, the stop element being projected and the pusher element retracted;

Figure 2 is a view similar to Figure 1, but showing the stop element retracted and the pusher element projected; and Figure 3 is a sectional view taken substantially on line III—III of Figure 1.

Referring more in detail to the drawings:

There is shown at 10 a sloping ramp which may have any suitable length and angle of slope for delivering cylindrical articles S. The positioning and handling device of the present invention is supported in a housing 12 beneath the ramp floor. The side walls of the housing have offsets 13 parallel to the ramp floor (Figure 3), and the end walls have ledges 14 and 15 preferably in about the same plane as the offsets (Figures 1 and 2). The mid-portion of the housing has a cross brace 16, the top of which is flush with the ramp floor. Offsets 13 carry upstanding brackets 17 and 18 at each side of brace 16. A stop element 19 is hinged to brackets 17 and extends down the ramp from its axis of hinging. A pusher element 20 is hinged to brackets 18 and extends up the ramp from its axis of hinging.

The stop and pusher elements may be retracted to positions substantially flush with the ramp floor, in which their free ends rest on ledges 14 and 15 respectively, or they may be projected somewhat above the ramp floor. These ledges thus act as stop means which limit movement of the elements as they are retracted. The operating mechanism automatically projects one of these elements whenever the other is retracted. This mechanism includes a first pair of toggles 21 and 22, which are pivoted to each other at a pivot joint 23 and to the bottom of the housing and to the stop element respectively, and a second pair of toggles 24 and 25, which are similarly associated with the pusher element. For motivating the toggles, the operating mechanism includes a double acting pneumatic cylinder 26 which contains a reciprocable piston having a piston rod 27. The outer end of the piston rod is pivotally connected to toggles 21 and 22 at pivotal connection 23 at which these toggles are joined to each other. The closed end of the cylinder is pivotally connected to toggles 24 and 25 at the pivotal connection between these toggles. Whenever either set of toggles is straightened, the element connected to this set of toggles is projected; otherwise this element is retracted. The housing wall below the stop element has a bumper block 28 which preferably is spring cushioned for engagement with toggle pivot 23 (Figure 2). The piston may be forced in either direction relative to the cylinder by air admitted through any suitable valves and hose connections, not shown.

In operation, when the piston in cylinder 26 is forced inwardly relative to the cylinder, or to the left as viewed in Figure 1, the two sets of toggles are drawn toward each other (Figure 1). Toggles 21 and 22 are thereby straightened and they project stop element 19. Pusher element 20 is retracted. In this position the stop element positions article S on the ramp and prevents its rolling.

When the piston in cylinder 26 is forced outwardly relative to the cylinder, or to the right as viewed in Figure 1, the piston and piston rod move until pivotal connection 23 engages bumper block 28. The weight distribution of article S insures that the rod rather than the cylinder moves as long as the rod is free to move. This movement spreads the two sets of toggles and thus retracts stop element 19. The parts are designed so that engagement between the pivotal connection and the bumper block takes place when the stop element is flush with the ramp floor. Further relative movement of the piston and cylinder forces the cylinder to the left and thus straightens toggles 24 and 25 (Figure 2). The pusher element 20 thereupon is projected and pushes article S down the ramp. The reverse of the movement just described occurs when the piston is forced to the left from this position.

Several similar positioning and handling devices may be placed along the length of the ramp. Either the stop element or the pusher element of each device always is projected. As articles roll down the damp, they engage the projected elements, which retard their motion. Thus the articles are prevented from gathering excessive momentum.

From the foregoing description, it is seen I have provided improved positioning and handling devices in which mechanism is provided for automatically starting articles in motion after their release and which automatically retards their motion to prevent their gathering excess momentum. Thus the device overcomes the disadvantages I have observed in previous devices for this purpose.

While I have shown and described only a single embodiment of the invention, it is apparent that modifications may arise. For example, the cylinder and the piston or the relation of the toggles could be reversed within the range of obvious mechanical equivalents. Therefore, I do not wish to be limited to the disclosure set forth but only by the scope of the appended claims.

I claim:

1. In a sloping ramp, a device for positioning and handling cylindrical articles comprising a stop element and a pusher element, a supporting structure beneath the ramp floor, means hinging said elements to said supporting structure for movement on adjacent axes, said stop element extending down the ramp from its axis of hinging and said pusher element extending up the ramp from its axis of hinging, said elements having retracted positions substantially flush with the ramp floor and projected positions above the ramp floor, stop means on said supporting structure for limiting movement of said elements as they are retracted, a set of toggles connected to said stop element and to said supporting structure, a second set of toggles connected to said pusher element and to said supporting structure, and motivating means connecting the two sets of toggles and adapted to spread the two sets of toggles from each other to retract one of said elements while projecting the other or to draw the two sets of toggles toward each other to reverse the movement of said elements.

2. In a sloping ramp, a device for positioning and handling cylindrical articles comprising a stop element and a pusher element, a supporting structure beneath the ramp floor, means hinging said elements to said supporting structure for movement on adjacent axes, said stop element extending down the ramp from its axis of hinging and said pusher element extending up the ramp from its axis of hinging, said elements having retracted positions substantially flush with the ramp floor and projected positions above the ramp floor, stop means on said supporting structure for limiting movement of said elements as they are retracted, a set of toggles pivotally connected to each other and to said stop element and to said supporting structure, a second set of toggles pivotally connected to each other and to said pusher element and to said supporting structure, and motivating means between the two sets of toggles pivotally connected to each set at the pivot points at which the toggles are connected to each other, said motivating means being adapted to spread the two sets of toggles from each other to retract one of said elements while projecting the other or to draw the two sets of toggles toward each other to reverse the movement of said elements.

3. In a sloping ramp, a device for positioning and handling cylindrical articles comprising a stop element and a pusher element, a supporting structure beneath the ramp floor, means hinging said elements to said supporting structure for movement on adjacent axes, said stop element extending down the ramp from its axis of hinging and said pusher element extending up the ramp from its axis of hinging, said elements having retracted positions substantially flush with the ramp floor and projected positions above the ramp floor, stop means on said supporting structure for limiting movement of said elements as they are retracted, a set of toggles pivotally connected to each other and to said stop element and to said supporting structure, a second set of toggles pivotally connected to each other and to said pusher element and to said supporting structure, and a double acting pneumatic cylinder and piston having a piston rod, one end of said piston rod being pivotally connected to one set of toggles at their pivotal connection to each other, one end of said cylinder being pivotally connected to the other set of toggles at their pivotal connection to each other, relative movement between said piston and cylinder spreading said two sets of toggles from each other or drawing them together and automatically projecting one of said elements while retracting the other.

4. In a sloping ramp, a device for positioning and handling cylindrical articles comprising a stop element and a pusher element, a supporting structure beneath the ramp floor, means hinging said elements to said supporting structure for movement on adjacent horizontal axes, said stop element extending down the ramp from its axis of hinging and said pusher element extending up the ramp from its axis of hinging, said elements having retracted positions substantially flush with the ramp floor and projected positions above the ramp floor, stop means on said supporting structure for limiting movement of said elements as they are retracted, a set of toggles pivotally connected to each other and to said stop element and to said supporting structure, a second set of toggles spaced from said first set of toggles and pivotally connected to each other and to said pusher element and to said supporting structure, a double acting pneumatic cylinder and piston having a piston rod, one end of said piston rod being pivotally connected to one set of toggles at their pivotal connection to each other, one end of said cylinder being pivotally connected to the other set of toggles at their pivotal connection to each other, and a cushioned stop on said supporting structure with which the pivotal connection of said first set of toggles to each other is engageable, relative outward movement of said piston and cylinder spreading said toggles and retracting said stop element until the pivotal connection of said first set of toggles engages said cushioned stop and thereafter projecting said pusher element, relative inward movement of said piston and cylinder drawing said toggles together and retracting said pusher element while projecting said stop element.

GEORGE A. HILEMAN.

REFERENCES CITED

The following references are of record in the file of this patent:

UNITED STATES PATENTS

| Number | Name | Date |
|---|---|---|
| 377,717 | Kline | Feb. 7, 1888 |
| 747,161 | Gillard | Dec. 15, 1903 |
| 1,542,651 | Alessandro | June 16, 1925 |
| 2,292,821 | Caulkins | Aug. 11, 1942 |